May 7, 1940.　　　　L. J. HIBBARD　　　　2,200,084
LOCOMOTIVE CONTROL SYSTEM
Filed Nov. 29, 1939　　　　2 Sheets-Sheet 1

WITNESSES:
Edward Michaels
N. E. Chilcott

INVENTOR
Lloyd J. Hibbard.
BY
G. M. Crawford
ATTORNEY

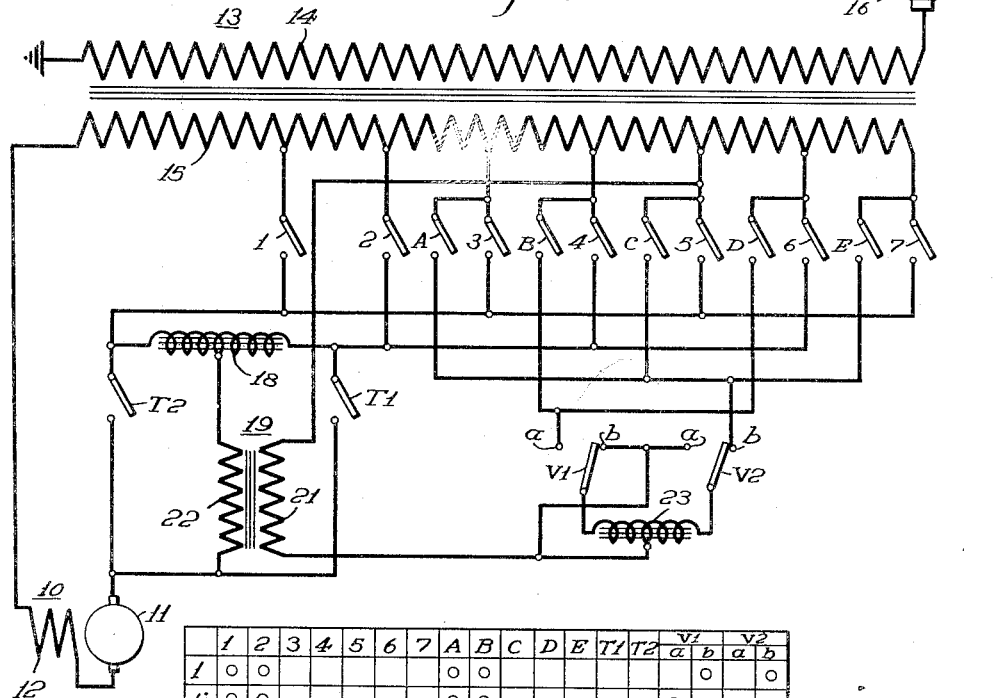

Patented May 7, 1940

2,200,084

UNITED STATES PATENT OFFICE 2,200,084

LOCOMOTIVE CONTROL SYSTEM

Lloyd J. Hibbard, Forest Hills, Pa., assignor to Westinghouse Electric & Manufacturing Company, East Pittsburgh, Pa., a corporation of Pennsylvania Application November 29, 1939, Serial No. 306,674

9 Claims. (Cl. 172—179)

My invention relates, generally, to control systems and more particularly, to systems for controlling the operation of electric locomotives.

An object of my invention, generally stated, is to reduce the size, weight and cost of the tap-changing equipment for an electric locomotive having alternating current motors which are accelerated by connecting the motors to successive taps on a power transformer.

A more specific object of my invention is to provide non-sag transitions from one transformer tap to the next transformer tap in order to eliminate all tractive effort surges during normal notching and to eliminate transient voltage peaks during such periods.

Another object of my invention is to both open and close the tap switches under no-load equipotential conditions during the notching sequence as transitions are made from one transformer tap to the next in order to reduce the duty imposed on the tap switches.

A further object of my invention is to reduce the number of transformer taps in order to simplify the design of the main transformer.

Other objects of my invention will be explained fully hereinafter or will be apparent to those skilled in the art.

In my copending application Serial No. 306,673, filed November 29, 1939, several schemes are described for performing the tap-changing operations during the acceleration of an alternating current motor which is supplied with power through a main transformer. The present application relates to additional schemes for performing such tap-changing operations.

For a fuller understanding of the nature and objects of my invention, reference may be had to the following detailed description, taken in conjunction with the accompanying drawings, in which:

Fig. 3 is a schematic diagram of a modified form of the invention; and

Fig. 4 is a sequence chart for the switches illustrated in Fig. 3.

Figures 1, 2:
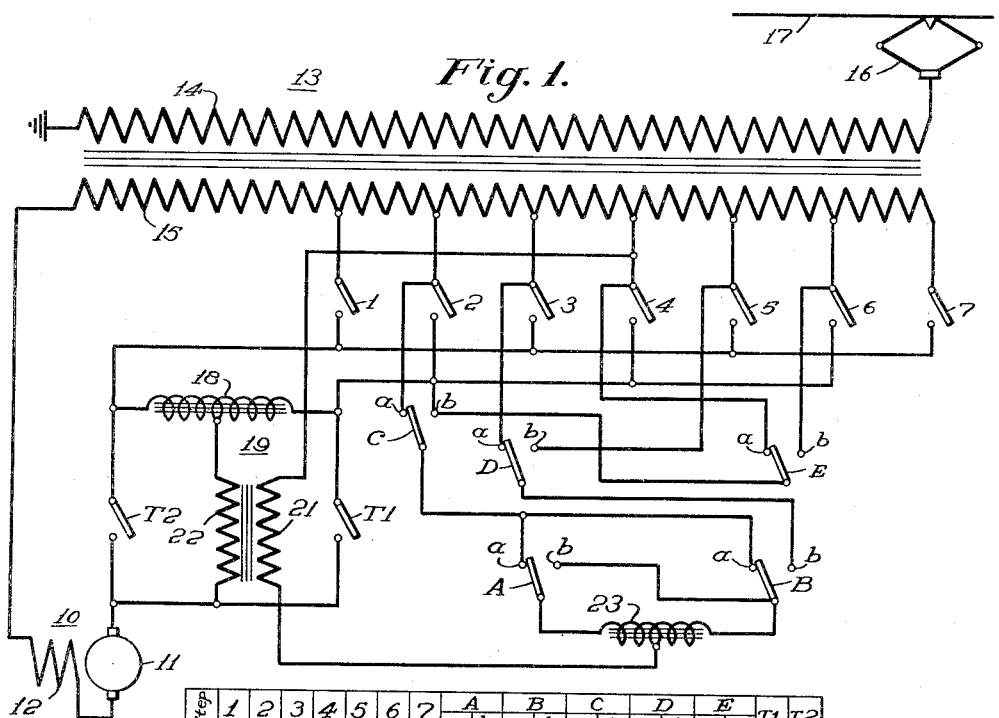
Figure 1 is a schematic diagram of a control system embodying my invention.
Fig. 2 is a chart showing the sequence of operation of the switches illustrated in Fig. 1.

Referring now to the drawings and, particularly, to Fig. 1, the system shown therein comprises a motor 10 having an armature winding 11 and a series field winding 12, a main transformer 13 having a primary winding 14 and a secondary winding 15, and a pantograph current collector 16 which engages a trolley conductor 17. The trolley conductor 17 may be energized from any suitable source of power, such as a power generating station (not shown).

It will be understood that the motor 10 may be utilized for driving a locomotive (not shown) and that additional motors may be provided if desired. In order to simplify the drawings, only one motor has been shown in the present application. The acceleration of the locomotive is controlled by varying the voltage applied to the traction motor 10 circuit by means of seven main tap switches, numbered from 1 to 7, inclusive, and a main preventive coil 18.

An auxiliary or notching transformer 19 having a primary winding 21 and a secondary winding 22 is used to divide each of the main notches in a plurality of equal parts. The voltage applied to the primary of the notching transformer is controlled by five double-throw switches, designated by the letters A to E, inclusive.

One terminal of the primary winding 21 of the notching transformer is connected to a tap approximately at the mid-point of the main transformer 13 while the other terminal may be moved by means of the switches A to E from one end of the transformer to the other, thereby changing the voltage of the secondary winding 22 from maximum in one direction through zero to maximum in the opposite direction. The voltage of the notching transformer is varied through its complete range for each pair of the main or numbered tap switches. The transition from one pair of numbered switches to the next is made without appreciable tractive effort sags or current surges.

An auxiliary preventive coil 23 is provided for use in conjunction with the auxiliary switches A to E, thereby permitting any two of these switches which are connected to opposite terminals of the preventive coil to be closed at the same time. Likewise, any two of the main tap switches 1 to 7 which are connected to opposite terminals of the main preventive coil 18 may be closed at the same time.

The tap switches 1 to 7 may be so interlocked in the usual manner that the simultaneous closing of any two switches which are connected to a common bus is prevented. It will be noted that the use of double-throw switches for the auxiliary tap switches simplifies the interlocking required for insuring the proper operation of the switches since it is mechanically impossible for a double-throw switch to engage two transformers simultaneously.

In order to reduce the duty imposed on the tap-changing switches, a pair of transition switches T1 and T2 is provided. The transition switches T1 and T2 are so operated that the tap switches 1 to 7 are opened under no-load equipotential conditions during the notching sequence as transitions are made from one transformer tap to the next. Likewise, the tap switches are closed under no-load equi-potential conditions during the notching operations.

The manner of making a transition from one pair of tap switches to the next may be more clearly understood by referring to the sequence chart shown in Fig. 2 which illustrates the sequence of operation of the foregoing switches. As shown in the sequence chart, the main tap switches 1 and 2 are closed at the start of the notching operations, thereby placing the midpoint of the main preventive coil 18 at a potential midway between the transformer taps to which the switches 1 and 2 are connected. With the auxiliary double-throw switches A, B, C, D, and E all on position $a$, as shown, the voltage of the secondary winding 22 of the notching transformer 19 is just one-half the voltage between the taps to which the switches 1 and 2 are connected and is in a bucking direction. Therefore, the voltage applied to the motor 10 is equal to the voltage of the tap to which the switch 1 is connected.

With the double-throw switches in the positions shown, it will be noted that the voltage applied to the primary winding 21 of the notching transformer is the voltage between the taps to which the switches 2 and 4 are connected. One terminal of the primary winding is connected to the tap switch 4 and the other terminal is connected to the tap switch 2 through the double-throw switches C, A, and B and the mid-point of the preventive coil 23. Since the current divides equally in the two parts of the preventive coil 23 when the switches A and B are in the positions shown, the preventive coil has no reactance drop and the potential applied to the lower terminal of the transformer winding 21 is essentially that of the tap to which the switch 2 is connected.

The voltage of the notching transformer 19 is now varied by operating the switches A, B, C, D, and E in the order indicated in the sequence chart until step 5 is reached. The notching transformer secondary voltage is now the same value as on step 1 but is in the opposite direction and boosts the motor voltage. Therefore, the voltage applied to the motor 10 is equal to the voltage of the transformer tap to which the switch 2 is connected. Thus, on step 5, with the switches A and B on position $a$ and switches C and E on position $b$, as indicated in the chart, the voltage applied to the primary winding 21 is the voltage between the taps to which the switches 4 and 6 are connected which is the same as the voltage between the taps 2 and 4 but is of opposite polarity.

It will be noted that an inter notch is obtained between each one of the main steps by merely operating one of the double-throw switches, thus the step 1$i$ is obtained by throwing the switch B from position $a$ to position $b$ to connect the preventive coil 23 across the tap switches 2 and 3, thereby applying a potential across the preventive coil equal to the potential between the taps 2 and 3 which reduces the voltage of the transformer 19 by one-half the potential between these two taps. In a similar manner an inter notch is obtained between each of the main steps throughout the notching operations.

If the transition switch T1 is closed when the potential applied to the motor 10 is equal to that of the tap to which the switch 2 is connected, which potential is obtained on step 5 as hereinbefore explained, there will be no change in the voltage conditions and the switch 1 can be opened since the switch T1 actually shunts the preventive coil 18 and the notching transformer 19 from the motor circuit. Under these conditions all of the load current is carried momentarily by the switches 2 and T1, therefore the switch 1 is opened under no-load conditions. Furthermore, the auxiliary switches C, D, and E may be returned to position $a$ for the start of another progression. If the switch 3 is now closed, it will merely carry the exciting current for the preventive coil and notching transformer without affecting the motor circuit. Therefore, the switch 3 is closed under no-load conditions.

The transition switch T1 can now be opened to complete the transition without any appreciable effect on the motor voltage since the voltage with the switches 2 and 3 closed and the auxiliary switches A, B, C, D, and E in position to cause the notching transformer 19 to have its maximum bucking effect is the same as with the switches 1 and 2 closed and the auxiliary switches in position to produce maximum boosting effect of the notching transformer 19.

As indicated in the sequence chart, the auxiliary switches A, B, C, D, and E are again operated in the same sequence as before until the voltage applied to the motor is equal to the potential of the tap to which the switch 3 is connected. At this time the transition switch T2 is closed and the motor current flows through the switches 3 and 4, thereby permitting transition to be made under no-load conditions, in a manner similar to the transition from switches 1 and 2.

After the completion of the transition, the operation of the auxiliary switches A, B, C, D, and E is repeated in the same sequence as for the steps shown in the chart. Therefore, it is believed to be unnecessary to illustrate a complete sequence chart in the present application. The notching is continued in a manner similar to that illustrated until the maximum desired voltage is applied to the motor.

From the foregoing description it is apparent that the utilization of double-throw switches, as herein described, reduces the total number of switches required in order to provide a desired number of accelerating steps. It also simplifies the interlocking requirements and eliminates any sag-back effect on the notching transformer 19 since the double-throw switches operate so quickly in changing from one position to the other that practically no reduction in the voltage applied to the notching transformer is noticed between steps.

In the modification of the invention illustrated in Fig. 3, in which similar parts are designated by the same reference characters as in Fig. 1, the auxiliary tap switches A, B, C, D, and E are single-throw switches instead of double-throw as in the system shown in Fig. 1. These switches are operated in pairs as shown in the chart in Fig. 4 to vary the voltage of the notching transformer 19 and to change the effect of the transformer 19 from a bucking to a boosting effect, and vice versa.

In addition to the auxiliary switches A to E, inclusive, a pair of double-throw switches V1 and V2 are utilized to provide an inter notch between each one of the steps obtained by the use of switches A to E, thereby increasing the total number of accelerating steps obtained. It will be seen that the total number of steps is almost doubled by the utilization of the two switches V1 and V2 which greatly increases the number of accelerating steps without materially increasing the equipment required.

Furthermore, it will be noted that each one of the inter notches is obtained by operating only one of the switches V1 or V2, which simplifies the control for these switches. The transition switches T1 and T2 function in the manner described hereinbefore to shunt the preventive coil 18 and the notching transformer 19 from the motor circuit, thereby permitting the tap switches to be opened and closed under no-load conditions, as in the system previously described.

As indicated in the chart in Fig. 4 the main tap switches 1 and 2 and the auxiliary switches A and B are closed at the start of the notching operations and the switches V1 and V2 are in position b, as shown. With the switches in these positions it will be seen that one-half of the preventive coil 23 is connected in a closed circuit through the switch V1 which permits current to circulate through this portion of the preventive coil to prevent the coil from having a reactance drop. Therefore, the potential applied to the primary winding 21 is equal to the voltage between the tap switches 3 and 5, which produces the maximum bucking effect of the transformer 19. The potential actually applied to the motor 10 at the start is equal to the potential of the tap to which the switch 1 is connected.

By operating the switch V1 to position a, the preventive coil 23 is connected across the taps to which the switches 3 and 4 are connected. Since one terminal of the primary winding 21 is connected to the mid-point of the preventive coil 23, the voltage applied to this terminal is one-half the voltage between the taps 3 and 4. In this manner the potential of the transformer 19 is reduced by an amount proportional to this voltage and the voltage applied to the motor is increased by such an amount.

When the switches B and C are first closed and the switches V1 and V2 are on position a, the switch V2 short-circuits one-half of the preventive coil 23 and the potential actually applied to one terminal of the transformer winding 21 is equal to the potential to which the tap switch 4 is connected, thereby further decreasing the bucking effect of the transformer 19. The inner notch 2i is obtained by actuating the switch V2 from position a to position b, thereby connecting the preventive coil 23 across the switches B and C, which are connected to the tap switches 4 and 5.

In this manner the potential of the transformer 19 is gradually reduced, passes through zero and is then increased to increase the voltage applied to the motor 10 until it is equal to the potential of the tap to which the switch 2 is connected. At this time the switch T1 may be closed and transition made from the switches 1 and 2 to the switches 2 and 3 under no-load equi-potential conditions in the same manner as hereinbefore described. Likewise the auxiliary switches A to E may be operated to their initial positions during the transition period, thereby placing all of the switches in the correct position for a repetition of the notching operations.

When the voltage applied to the motor becomes equal to the potential of the tap to which the switch 3 is connected, the transition switch 2 may be closed and transition made from the switches 2 and 3 to the switches 3 and 4. The notching operation may be continued in the foregoing manner until the maximum voltage is applied to the motor. The transition switches T1 and T2 are closed alternately and the operation of the switches A to E, V1 and V2, is repeated in the same sequence as shown in the portion of the chart illustrated. Accordingly, it is believed to be unnecessary to show a complete sequence chart in the present application.

From the foregoing discussion it is apparent that the systems disclosed herein provide a large number of accelerating steps for accelerating alternating current motors without materially increasing the amount of equipment over that required for previously known systems having a smaller number of steps. Furthermore, the present systems are simple in operation, which reduces the amount of protective interlocking required. Also, since transition is made from one step to the next under equi-potential conditions sag-back in the tractive effort of the motor is eliminated.

Since numerous changes may be made in the above described construction and different embodiments may be made without departing from the spirit and scope thereof, it is intended that all matter contained in the foregoing description or shown in the accompanying drawings shall be interpreted as illustrative and not in a limiting sense.

I claim as my invention:

1. In a control system, in combination, a main transformer, a motor energized from said transformer, a plurality of switches for changing taps on said transformer to vary the voltage on the motor, a part of said tap switches being connected to one common bus and the remainder of said tap switches being connected to another common bus, a preventive coil connected across said common buses, an auxiliary transformer having a primary winding and a secondary winding, said secondary winding having one terminal connected to the mid-point of said preventive coil and the other terminal connected in the motor circuit, an additional preventive coil, additional switches connected to taps on the main transformer, and double-throw switches for connecting said additional preventive coil to said additional switches, said additional preventive coil being connected in the circuit for the primary winding of the auxiliary transformer.

2. In a control system, in combination, a main transformer, a motor energized from said transformer, a plurality of switches for changing taps on said transformer to vary the voltage on the motor, a part of said tap switches being connected to one common bus and the remainder of said tap switches being connected to another common bus, a preventive coil connected across said common buses, an auxiliary transformer having a primary winding and a secondary winding, said secondary winding having one terminal connected to the mid-point of said preventive coil and the other terminal connected in the motor circuit, an additional preventive coil, additional switches connected to taps on the main transformer, and double-throw switches for connecting said additional preventive coil to said additional switches, said primary winding of the auxiliary transformer having one terminal connected to the main transformer and the other terminal connected to the mid-point of the additional preventive coil.

3. In a control system, in combination, a main transformer, a motor energized from said transformer, a plurality of switches for changing taps on said transformer to vary the voltage on the motor, a part of said tap switches being connected to one common bus and the remainder of said tap switches being connected to another common bus, a preventive coil connected across said common buses, an auxiliary transformer having a primary winding and a secondary winding, said secondary winding having one terminal connected to the mid-point of said preventive coil and the other terminal connected in the motor circuit, an additional preventive coil, additional switches connected to taps on the main transformer, double-throw switches for connecting said additional preventive coil to said additional switches, said primary winding of the auxiliary transformer having one terminal connected to the main transformer and the other terminal connected to the mid-point of the additional preventive coil, and a transition switch for shunting the auxiliary transformer from the motor circuit during transition from one pair of tap switches to another.

4. In a control system, in combination, a main transformer, a motor energized from said transformer, a plurality of switches for changing taps on said transformer to vary the voltage on the motor, a part of said tap switches being connected to one common bus and the remainder of said tap switches being connected to another common bus, a preventive coil connected across said common buses, an auxiliary transformer having a primary winding and a secondary winding, said secondary winding having one terminal connected to the mid-point of said preventive coil and the other terminal connected in the motor circuit, an additional preventive coil, additional switches connected to taps on the main transformer, double-throw switches for connecting said additional preventive coil to said additional switches, said primary winding of the auxiliary transformer having one terminal connected to the main transformer and the other terminal connected to the mid-point of the additional preventive coil, and a pair of transition switches for shunting the auxiliary transformer from the motor circuit during transition from one pair of tap switches to another, said transition switches being operated alternately.

5. In a control system, in combination, a main transformer, a motor energized from said transformer, a plurality of switches for changing taps on said transformer to vary the voltage on the motor, a part of said tap switches being connected to one common bus and the remainder of said tap switches being connected to another common bus, a preventive coil connected across said common buses, an auxiliary transformer having a primary winding and a secondary winding, said secondary winding having one terminal connected to the mid-point of said preventive coil and the other terminal connected in the motor circuit, an additional preventive coil, additional switches connected to taps on the main transformer, double-throw switches for connecting said additional preventive coil to said additional switches, said primary winding of the auxiliary transformer having one terminal connected to the main transformer and the other terminal connected to the mid-point of the additional preventive coil, and a pair of transition switches for shunting the auxiliary transformer from the motor circuit during transition from one pair of tap switches to another, one of said transition switches being connected to one of said common buses and the other transition switch being connected to the other common bus, said transition switches being operated alternately.

6. In a control system, in combination, a main transformer, a motor energized from said transformer, a plurality of switches for changing taps on said transformer to vary the voltage on the motor, a part of said tap switches being connected to one common bus and the remainder of said tap switches being connected to another common bus, a preventive coil connected across said common buses, an auxiliary transformer having a primary winding and a secondary winding, said secondary winding having one terminal connected to the mid-point of said preventive coil and the other terminal connected in the motor circuit, an additional preventive coil, additional switches connected to taps on the main transformer, a part of said additional switches being connected to one bus and the remainder of said additional switches being connected to another bus, and double throw switches for connecting said additional preventive coil to said buses, said additional preventive coil being connected in the circuit for the primary winding of the auxiliary transformer.

7. In a control system, in combination, a main transformer, a motor energized from said transformer, a plurality of switches for changing taps on said transformer to vary the voltage on the motor, a part of said tap switches being connected to one common bus and the remainder of said tap switches being connected to another common bus, a preventive coil connected across said common buses, an auxiliary transformer having a primary winding and a secondary winding, said secondary winding having one terminal connected to the mid-point of said preventive coil and the other terminal connected in the motor circuit, an additional preventive coil, additional switches connected to taps on the main transformer, a part of said additional switches being connected to one bus and the remainder of said additional switches being connected to another bus, and double-throw switches for connecting said additional preventive coil to said buses, said additional preventive coil being connected in the circuit for the primary winding of the auxiliary transformer, said double-throw switches being disposed to form a closed circuit including a portion of said additional preventive coil.

8. In a control system, in combination, a main transformer, a motor energized from said transformer, a plurality of switches for changing taps on said transformer to vary the voltage on the motor, a part of said tap switches being connected to one common bus and the remainder of said tap switches being connected to another common bus, a preventive coil connected across said common buses, an auxiliary transformer having a primary winding and a secondary winding, said secondary winding having one terminal connected to the mid-point of said preventive coil and the other terminal connected in the motor circuit, an additional preventive coil, a plurality of double-throw switches connected to taps on the main transformer, and additional double-throw switches for connecting said additional preventive coil to said first-named double-throw switches and in the circuit for the primary winding of the auxiliary transformer.

9. In a control system, in combination, a main transformer, a motor energized from said transformer, a plurality of switches for changing taps on said transformer to vary the voltage on the motor a part of said tap switches being connected to one common bus and the remainder of said tap switches being connected to another common bus, a preventive coil connected across said common buses, an auxiliary transformer having a primary winding and a secondary winding, said secondary winding having one terminal connected to the mid-point of said preventive coil and the other terminal connected in the motor circuit, an additional preventive coil, a plurality of double-throw switches connected to taps on the main transformer, and additional double-throw switches for connecting said additional preventive coil to said first-named double-throw switches and in the circuit for the primary winding of the auxiliary transformer, said additional double-throw switches being disposed to include all of said additional preventive coil in a closed circuit.

LLOYD J. HIBBARD.